US010773944B2

(12) United States Patent
Maier

(10) Patent No.: US 10,773,944 B2
(45) Date of Patent: Sep. 15, 2020

(54) SMART VESSEL CONTAINMENT AND DISPENSING UNIT

(71) Applicant: Donald Christian Maier, Camas, WA (US)

(72) Inventor: Donald Christian Maier, Camas, WA (US)

( * ) Notice: Subject to any disclaimer, the term of this patent is extended or adjusted under 35 U.S.C. 154(b) by 0 days.

(21) Appl. No.: 16/372,693

(22) Filed: Apr. 2, 2019

(65) Prior Publication Data

US 2019/0300358 A1 Oct. 3, 2019

Related U.S. Application Data

(60) Provisional application No. 62/652,136, filed on Apr. 3, 2018.

(51) Int. Cl.

| | |
|---|---|
| ***B67D 1/08*** | (2006.01) |
| ***H04W 4/38*** | (2018.01) |
| ***B67D 1/04*** | (2006.01) |
| ***G08C 17/00*** | (2006.01) |
| ***G08B 7/06*** | (2006.01) |

(52) U.S. Cl.

CPC ......... *B67D 1/0888* (2013.01); *B67D 1/0869* (2013.01); *B67D 1/0884* (2013.01); *B67D 1/0891* (2013.01); *B67D 1/04* (2013.01); *B67D 2210/00044* (2013.01); *G08B 7/06* (2013.01); *G08C 17/00* (2013.01); *H04W 4/38* (2018.02)

(58) Field of Classification Search

CPC .. B67D 1/0869; B67D 1/0884; B67D 1/0888; B67D 1/0891; H04W 4/38

USPC .......................................... 222/396; 215/13.1

See application file for complete search history.

(56) References Cited

U.S. PATENT DOCUMENTS 3,120,319 A * 2/1964 Buddrus ............ B65D 23/0885 215/12.2
3,178,896 A * 4/1965 Sandsto .................. F25B 21/02 62/3.64
3,243,965 A * 4/1966 Jepson .................... F25B 21/02 62/3.64
3,265,250 A * 8/1966 Meyer ................ B65D 81/3841 222/131
3,367,538 A * 2/1968 Hasselbeck .......... B67D 1/0418 222/61
4,002,257 A * 1/1977 Hatridge ................ A47J 41/00 222/568

(Continued)

*Primary Examiner* — Patrick M. Buechner
*Assistant Examiner* — Michael J. Melaragno
(74) *Attorney, Agent, or Firm* — Mark S Hubert

(57) ABSTRACT

A smart vessel containment and dispensing unit capable of communication and data sharing across various wireless transmission protocols to linked devices. It has a visual display interface, is capable of cooling, pressurizing and storing the contents of an open growler as well as collecting data about the beverage, data regarding consumption of the beverage, as well as demographic data about the user that is relayed to and interpreted by a data analytical unit that can generate and transmit data to the consumer about beverage related matters. The containment will internally accommodate a beverage growler in an aesthetic transportable, energy efficient envelope that may be stored on a countertop, in a cabinet, or taken on the go. It will provide the consumer with all the information about the contents of the growler as well as their identification and physical parameters.

6 Claims, 5 Drawing Sheets

22 24 16 26 20 34 30 28 36 18 14 110 32 8 38 10 40 42 2 44 4 6 12

(56) References Cited

U.S. PATENT DOCUMENTS 4,265,374 A * 5/1981 Sebalos ................. B65D 83/62 222/105
4,517,445 A * 5/1985 Tatsumi ................. A47J 31/50 215/13.1
4,633,678 A * 1/1987 Lea ..................... B67D 1/0857 220/592.19
4,921,135 A * 5/1990 Pleet ..................... B67B 7/26 222/105
5,251,787 A * 10/1993 Simson ................ B67D 1/0462 222/105
5,564,583 A * 10/1996 Kelley .................. A45C 11/20 220/23.83
5,572,872 A * 11/1996 Hlavacek .............. A47G 23/04 62/3.3
5,634,343 A * 6/1997 Baker, III ........... B67D 3/0009 222/146.6
5,641,094 A * 6/1997 Wunsch ............... B67D 1/0431 222/396
5,875,921 A * 3/1999 Osgar ...................... B67D 7/02 222/1
6,003,319 A * 12/1999 Gilley .................... F25B 21/02 165/104.21
6,119,461 A * 9/2000 Stevick .................. F25B 21/04 62/3.3
6,237,345 B1 * 5/2001 Kalman ............... B67D 1/0005 62/3.64
6,370,883 B1 * 4/2002 Kugel ..................... B67D 1/02 62/3.64
6,375,048 B1 * 4/2002 van der Meer ...... B67D 1/0462 222/396
6,454,131 B1 * 9/2002 Van Der Meer ......... B01D 3/20 222/105
6,481,238 B1 * 11/2002 Jennings .................. B67D 1/06 62/371
6,616,013 B2 * 9/2003 Tansley ................ B67D 1/0009 141/67
6,736,298 B2 * 5/2004 Busick ................. B01D 35/143 222/146.1
6,824,013 B2 * 11/2004 Harrison ............... B05B 9/0861 222/66
7,047,762 B2 * 5/2006 Luzaich ..................... A23L 3/00 62/3.2
7,188,751 B2 * 3/2007 Van Der Klaauw ........................ B67D 1/0412 222/146.6
7,237,390 B1 * 7/2007 Nelson ................. B67D 1/0859 62/3.64
7,757,908 B1 * 7/2010 Buhl, Jr. .............. B67D 1/0406 141/231
7,975,881 B1 * 7/2011 Glucksman .......... B67D 1/0425 221/150 R
8,596,496 B2 * 12/2013 Malinski ............. B67D 3/0009 222/105
8,844,774 B2 * 9/2014 Leys .................. B65D 83/0055 222/105
9,016,528 B2 * 4/2015 Peirsman ............. B67D 1/0412 222/396
9,035,222 B2 * 5/2015 Alexander ........... A47G 19/027 219/432
9,193,577 B2 * 11/2015 McIntyre ................. B67D 1/04
9,266,708 B2 * 2/2016 Rasmussen .......... B67D 1/0081
9,352,949 B2 * 5/2016 Rege .................... B67D 1/0418
9,499,386 B2 * 11/2016 Malinski ............. B67D 3/0009
9,533,865 B2 * 1/2017 Sonnichsen .......... B67D 1/0808
9,611,131 B2 * 4/2017 Lehman ............... B67D 1/1405
9,714,778 B2 * 7/2017 Swanson ................. F25B 21/02
9,919,910 B2 * 3/2018 Gibson ................ B67D 1/0406
9,974,401 B2 * 5/2018 Alexander ........... A47G 19/027
9,995,529 B1 * 6/2018 Banks ................... F25D 31/005
10,065,848 B2 * 9/2018 Volin ................... B67D 1/0857
10,081,530 B2 * 9/2018 Gibson ................ B67D 1/0406
10,106,394 B2 * 10/2018 Rege .................... B67D 1/0418
10,252,902 B2 * 4/2019 Peirsman ............. B67D 1/0057
10,258,940 B2 * 4/2019 Van Damme ........ B67D 1/0462
10,329,061 B2 * 6/2019 Dias ..................... A47G 19/025
10,364,137 B2 * 7/2019 Hollister ............. B67D 1/0418
2003/0071067 A1 * 4/2003 Sluijter ................ B67D 1/0462 222/183
2003/0080142 A1 * 5/2003 Meheen ............... B67D 1/1252 222/1
2004/0011828 A1 * 1/2004 Van Der Klaauw ........................ B67D 1/0412 222/527
2004/0069805 A1 * 4/2004 Van Der Klaauw ........................ B67D 1/0412 222/146.6
2005/0199057 A1 * 9/2005 Hadala .................... G01F 23/22 73/295
2006/0000221 A1 * 1/2006 Culp ...................... F25B 21/02 62/3.6
2006/0000277 A1 * 1/2006 Pietrorazio ............. G01F 22/00 73/293
2006/0011664 A1 * 1/2006 Hammond ........... B67D 1/0406 222/399
2007/0056990 A1 * 3/2007 Pakkert ................ B67D 1/0431 222/146.6
2008/0022695 A1 * 1/2008 Welle ...................... F25B 21/04 62/3.7
2008/0116262 A1 * 5/2008 Majer ....................... G07F 5/18 235/381
2008/0217361 A1 * 9/2008 Vitantonio ........... B67D 1/0418 222/399
2009/0049845 A1 * 2/2009 McStravick ............ F25B 21/02 62/3.62
2009/0151891 A1 * 6/2009 Li .................... A47J 27/21041 165/48.1
2009/0258120 A1 * 10/2009 Zeitler ................. B67D 1/0884 426/232
2009/0266101 A1 * 10/2009 Sloot .................... B67D 1/0869 62/389
2010/0206900 A1 * 8/2010 Dobrusskin .......... B67D 1/0079 222/95
2011/0163128 A1 * 7/2011 Taguchi ............... B67D 1/0869 222/146.6
2012/0138161 A1 * 6/2012 Wolthers ............. B67D 1/0431 137/15.12
2012/0145750 A1 * 6/2012 Hollars ................ B67D 1/0412 222/399
2012/0228333 A1 * 9/2012 Ophardt ............... A47K 5/1207 222/192
2012/0285998 A1 * 11/2012 Peirsman ............. B67D 1/0412 222/396
2012/0312031 A1 * 12/2012 Olsen ...................... F25B 21/02 62/3.62
2012/0325856 A1 * 12/2012 Ito ........................ B67D 1/0857 222/146.6
2013/0098946 A1 * 4/2013 Peirsman ................. B67D 1/04 222/399
2014/0231442 A1 * 8/2014 Hill .................... A47G 19/2266 220/740
2014/0246396 A1 * 9/2014 Jepson ................. B65D 81/245 215/260
2014/0262899 A1 * 9/2014 Mociak .............. B65D 41/0442 206/459.1
2014/0374443 A1 * 12/2014 Young .................. B67D 1/0406 222/105
2015/0024349 A1 * 1/2015 Bischoff ................ A47G 23/16 434/127
2015/0122688 A1 * 5/2015 Dias ..................... A47G 19/025 206/459.1
2015/0128615 A1 * 5/2015 Hu .......................... F25B 21/02 62/3.64
2015/0225222 A1 * 8/2015 Jaffe .................... B67D 1/0869 222/1
2015/0274501 A1 * 10/2015 Lehman ............... B67D 1/1405 222/556
2015/0336785 A1 * 11/2015 Rege .................... B67D 1/0418 222/1

(56) References Cited

U.S. PATENT DOCUMENTS

2016/0251209 A1* 9/2016 Standaert ............. B67D 1/0462 222/95
2016/0251212 A1* 9/2016 Rege .................... B67D 1/0418 137/12
2017/0101301 A1* 4/2017 Volin ................... B67D 1/0857
2017/0107092 A1* 4/2017 Peirsman ............. B67D 1/0057
2017/0158484 A1* 6/2017 Lehman ............... B67D 1/0406
2017/0174495 A1* 6/2017 McIntyre ............. B67D 1/0412
2017/0215643 A1* 8/2017 Beach ..................... F25B 21/04
2017/0240338 A1* 8/2017 Wendt ..................... A47J 41/00
2017/0240405 A1* 8/2017 Gibson ................ B67D 1/0406
2017/0267510 A1* 9/2017 Chapman ............. B67D 1/0801
2017/0275146 A1* 9/2017 Hollister .............. B67D 1/0418
2018/0162711 A1* 6/2018 Gibson ................ B67D 1/0406
2018/0208448 A1* 7/2018 Zimmerman ........ B67D 1/0888
2018/0325296 A1* 11/2018 Lavi ....................... B65D 85/72
2019/0071298 A1* 3/2019 Tomforde ............ B67D 1/0888
2019/0101326 A1* 4/2019 Scofield .................. F25B 21/04
2019/0145688 A1* 5/2019 Tsuno ....................... F25D 3/06
2019/0193098 A1* 6/2019 Harbaugh ............... B05B 9/043
2019/0226728 A1* 7/2019 Hunter .................... F25B 21/04

* cited by examiner 22
24
16
26
20
34
36
30
28
18
14
110
32
38
8
10
40
42
2
44
4
6
12

24
20
34
36
4
32
38
10
40
42
44

ADMINISTRATOR
84
86
82
88
90
92
VENDORS
80
USER
78
72
76
74
72
70
2
SMART UNIT
USER

SMART VESSEL CONTAINMENT AND DISPENSING UNIT

PRIORITY

This utility patent application claims priority from provisional patent application Ser. 62/652,136 filed 2018 Apr. 3.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to dispensing of consumable fluids, and more particularly to a unit integrated with the latest wireless communication technology and software applications for providing information about the contained beverage to the consumer as well as collecting data about its users' preferences.

BACKGROUND

The days of only consuming prepackaged cans or bottles of beverages has gone. Now consumers purchase fresh beverages such as beer, cider, wine and kombucha from their local fill station in their own supplied containers, and bring the beverages home for personal enjoyment in their own time and spaces. While generally the industry has standardized the use of 64 oz. uninsulated glass containers, the contents of these are often too much for a single person to consume in a single sitting. This is problematic.

The current industry standard containers (known as a "growlers") have no pressurization ability, no independent cooling ability, no temperature indication, no pressure indication, possibly no content level indication and no content identification. Once the growler is opened, generally the entire contents must be consumed for it will go flat and spoil when kept in a non-pressurized container where oxygen is allowed to come in contact with the beverage. They have to be kept close to a cooling source, but often because of their large size, these containers cannot be accommodated in a cooler or a refrigerator. Lastly, there is no education for the buyer about local specials, different types of beverages, locations of filler stations, and the like.

Any growler that could solve all of the aforementioned problems would fulfill a long-felt need in the beverage industry. The present invention provides a novel approach using new and existing technology to solve these problems.

BRIEF SUMMARY

In accordance with various embodiments, a smart vessel containment and dispensing unit capable of communication and data sharing across various wireless transmission protocols to linked devices is provided. It may have a visual display interface and be capable of cooling, pressurizing and storing the contents of an open growler as well as collecting data about the beverage, data regarding consumption of the beverage, as well as demographic data about the user that is relayed to and interpreted by a data analytical unit that can generate and transmit data to the consumer about beverage related matters. It will internally accommodate the growler in an aesthetic transportable, energy efficient envelope that may be stored on a countertop, in a cabinet, or taken on the go. It will provide the consumer with all the information about the contents of the growler as well as their identification and physical parameters.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
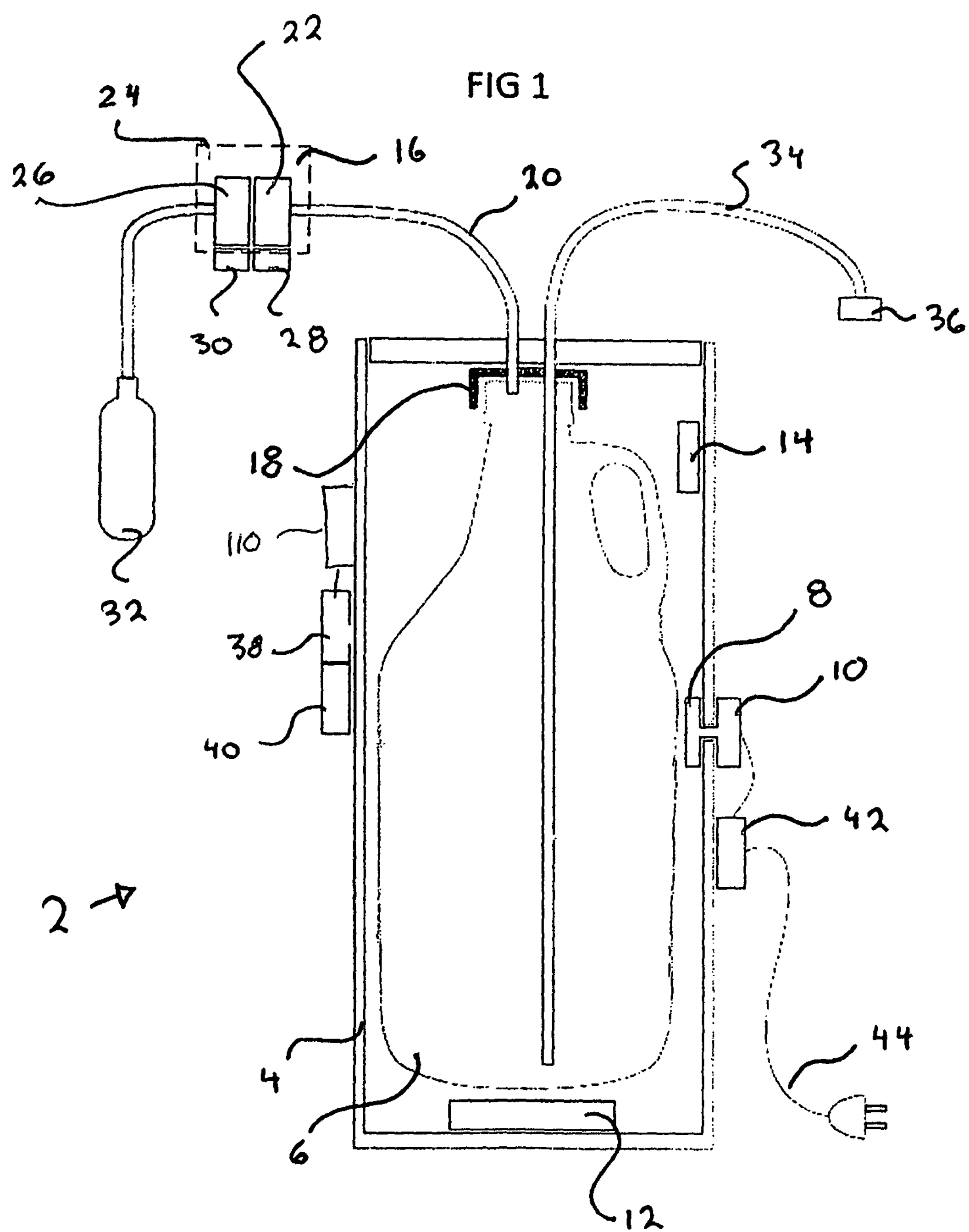
FIG. 1 is a side cross sectional representative view of an embodiment of a smart vessel containment and dispensing unit with an internally housed growler.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in generalized, representative diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "growler and growler bottle" refers to any configuration of portable Tillable container holding any of a specific volume of beverages as set by the beverage industry. Currently these volumes are 32, 64 and 128 fluid ounces. A conventional growler is a "jug" style glass bottle that holds four pints (64 US oz) and is 1½ inches high×5¾ inches in diameter.

As used herein, the term "Peltier device" refers to a thermoelectric device that uses the Peltier effect to create a heat flux between the junction of two different types of materials. It is also called a Peltier heat pump, solid state refrigerator, or thermoelectric cooler (TEC). It is a solid-state active heat pump which transfers heat from one side of the device to the other, with consumption of electrical energy, depending on the direction of the current. It can be used either for heating or for cooling or as a temperature controller that either heats or cools.

As used herein, the terms "microprocessor" or "logic chip" may refer to a computer processor on a microchip that contains all, or most of, the central processing unit (CPU) functions. The microprocessor may incorporate a real time clock and either or both of volatile/nonvolatile memory and performs arithmetic and logic operations based on input signals or data from remote devices such as a pressure transmitter, thermocouple, strain gauge, a tactile input pad, or wirelessly linked smart devices such as phones, computers, computer tablets and the like, or manually operated electrical switches. The processor will output operational signals that integrate with other elements of the smart unit, such as the Peltier device, the wireless transceiver (Bluetooth or WiFi), the visual display unit, and the power source (battery or A/C). This will include the output of collected and algorithmically derived data to external computing (smart) devices wirelessly linked such as phones, computers, computer tablets and the like.

As used herein, the term "processor" can mean a single processor or processor core (of any type) or a plurality of processors or processor cores (again, of any type) operating individually or in concert. The functionality described herein can be allocated among the various processors or processor cores as needed for specific implementations. Thus, it should be noted that, while various examples of processors may be described herein for illustrative purposes, these examples should not be considered limiting.

The present invention relates to a novel design for a smart beverage vessel containment and dispensing unit (hereinafter "smart unit"). One of the most novel aspects of this unit, is that unlike the prior art devices, the smart unit does not require that the beverage contents be transferred (IE poured) into another container generally which is inseparable from the device. Rather, the growler is placed directly inside the smart unit where the beverage temperature and pressure can be accurately controlled so as to provide the user with the freshest tasting beverages. The temperature control of this installed growler bottle is efficiently enabled because the smart unit is a double walled, stainless steel vacuum sealed container.

The second novel aspect of the smart unit is the use of double-walled vacuum-insulation for the container in which to place the growler. Compared to other types of insulation such as polyurethane or polystyrene, double-walled vacuum-insulation provides superior insulating properties and minimizes insulation thickness for an equivalent R-value or thermal resistance. Employing the use of double-walled vacuum-insulation for the smart unit provides for a more compact product and minimizes its footprint on the kitchen countertop. This is highly important in the smart unit's design to fit within the kitchen countertop environment and provides a significant competitive advantage for the smart unit.

The third novel feature of the smart unit is its ability to communicate not only the status of its contents (temperature, level, pressure, type of beverage) but that it will collect customer data and display data retrieved from a web portal and/or cloud-based storage unit. In some embodiments, voice interaction may be employed and installed onboard a microprocessor or integrated with any of the existing smart voice interaction systems such as Amazon Echo®.

A fourth novel feature of the smart unit is that it incorporates a Peltier device with a double-walled vacuum-insulated vessel such that a heatsink with high thermal conductivity penetrates the double-wall of vacuum-insulated vessel so vacuum integrity within the double-wall is maintained and heat is optimally and efficiently transferred from the growler bottle through a thermally high conductive heat path through the high thermal resistance of the double-walled vacuum-insulated container.

A fifth novelty of the smart unit is that it provides a collection point of vast amounts of data about any specific group of beverage consumers (i.e. craft beer drinkers) that can be analyzed and parsed out to paying third parties (i.e. beer vendors) after running specifically tailored analytical queries. The information provided will be based on current demographics and patterns of the beer drinking populace.

Figure 2:
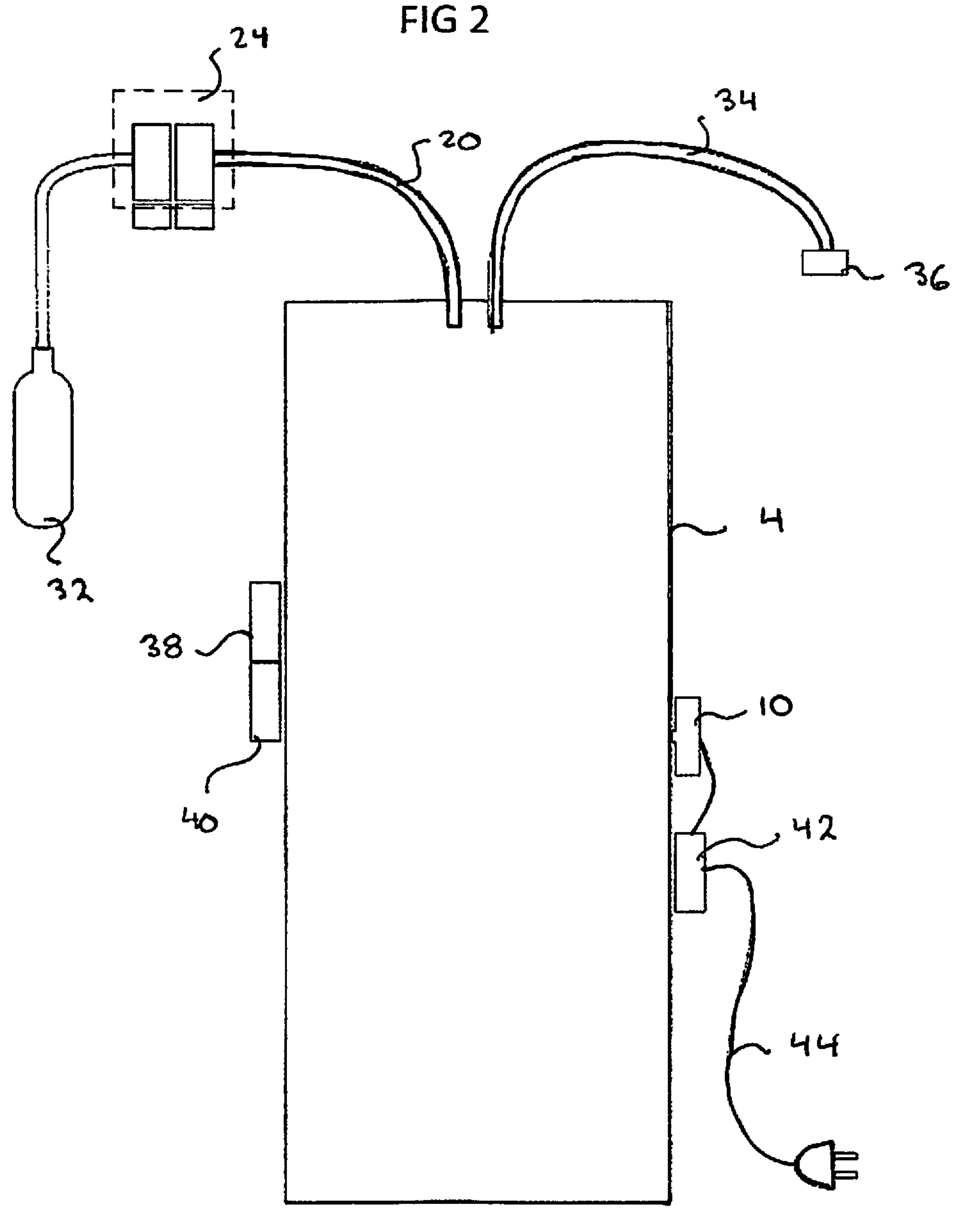
FIG. 2 is a side representative view of an embodiment of a smart vessel containment and dispensing unit.

Looking at FIGS. 1 and 2 it can be seen that the smart unit 2 has a double wall vacuum insulated vessel 4 (preferably walls are made of stainless steel or a polymer) sized to closely accommodate a 64 ounce growler bottle 6 of the conventional dimensions of 11½ inches height and 5¾ inches in diameter. Thus the internal volume will exceed that of 64 ounces or 115.5 cubic inches. Although not illustrated herein, a removeable compressible liner may be incorporated to ensure that the growler bottles (especially those with smaller diameters) when situated in the internal cavity of the smart unit 2, are able to firmly contact the heat sink plate 8. (Although in alternate embodiments the vessel 4 may be configured dimensionally to accommodate aluminum "Crowler" cans, mylar fluid bags or other commercial beverage storage containers.)

Although termed a "vacuum insulated vessel" 4 it is a container with a top 100, a bottom 98, an exterior side wall 94 and an interior side wall 96 that have an airtight sealed configuration defining an annulus 90 therebetween ("double side wall"). The top has a pair of orifices to allow the passage of the pressurizing tube 20 and the beverage dispensing tube 34. The atmosphere in the annulus is not a complete vacuum, rather it has a reduced pressure with respect to that of the ambient surrounding atmosphere (approximately 14.7 psi). The bottom 98 may be insulated or not. In the preferred embodiment the bottom 98 is insulated and has an exterior bottom wall 88 and an interior bottom wall 86 in an airtight sealed configuration that further defines the annulus 90 discussed above. There is also a sealed passage 102 therebetween the double side walls.

On the exterior surface of the vessel 4 is mounted a microprocessor/processor unit 38 and a wireless communication device 40 (preferably WiFi or Bluetooth) as well as a dual source (AC/DC) power supply 42. Through the double side wall of the insulated vessel 4 is a sealed passage that allows the Peltier device 10 to operate across the inside and outside of the smart unit 2. The Peltier device 10 is mounted on the exterior wall of vacuum insulated vessel 4. The inner dimensions of the vessel 4 and the outer dimensions of the growler bottle 6 will have close enough dimensional tolerances so that there is contact between the side wall of the growler bottle 6 and the heat sink plate 8 for the Peltier device 10 located on the inner side wall of the internal cavity of the smart unit 2. (As discussed above, smaller diameter growlers will utilize a removeable, compressive partial liner.)

There is a cap 18 sealing the top (fellable orifice) of the growler bottle 6 with a removeable/replaceable elastomer seal about the area it contacts and connects to the vessel 4. The cap 18 has a first orifice with a pressure sealed pressurization line 20 coming from the low-pressure side 22 of the two-stage pressure regulator 24. The pressurization line 20 has a self-sealing quick connect fitting (not illustrated). The cap 18 also has a second orifice with a pressure sealed beverage supply tube 34 that provides the pressurized beverage to the tap 36 for dispensing. (This tube will be connected to the cap 18 by a self-sealing quick connect fitting. There is a pressure relief valve that may be located on the cap (not illustrated) or on the beverage supply tube/tap assembly. The pressurization tube 20 ends near the top of the growler bottle 6 while the beverage supply tube 34 extends to the bottom of the growler bottle 6. In this way, the volume of beverage is pressurized from its top surface forcing the content out the bottom and to the tap 36.

There is a band (not illustrated) that is screwed over the cap 18 and onto the threads of the glass growler 6 to tightly clamp the cap 18 to the growler bottle. This two-part cap assembly allows the cap 18 to be fastened to the growler bottle 6 and maintain a specific orientation by turning/rotating the band to tighten and seal the cap 18 to the growler bottle 6 (similar to how a Mason jar lid is attached to the jar by turning the band that mates with the screws on the jar). This allows the cap 18 to remain oriented/fixed in one direction, allowing for the lid, with the fluid outlet tube and the CO2 inlet tube attached, to be optimally oriented to align the respective tubes to fit within the vessel 4.

Also, by keeping the lid 18 from turning, seal integrity is preserved. The seal is firmly clamped onto the growler bottle top with a downward force only. It is not subjected to a downward force combined with a rotational force that a one-piece cap design would place on the seal. The combination of a downward force and a rotational force on the seal would subject it to abrasions, cuts and/or tears that would affect the seal's integrity.

In the bottom on the smart unit 2 is a strain gauge 12 or equivalent pressure sensor to provide weight values for the growler bottle 6. In alternate embodiments, this may be replaced or supplemented by other electronic volume sensing technology devices such as capacitive, ultra-sonic or optical liquid-level sensors.

A thermocouple 14 or equivalent temperature measuring sensor is located on the inside of the smart unit 2. Although not illustrated, the thermocouple 14 and strain gauge 12 will be operational contact with the microprocessor/processor 32. In certain alternate embodiments, the two-stage regulator may also be operationally connected. Also, although not illustrated in certain embodiments the microprocessor/processor 32 may be physically integrated with a visual display unit which may or may not have tactile touch controls. In other alternate embodiments, these may be operationally connected but at separate locations on the vessel 4. In further embodiments, the visual display panel may be a separate panel wirelessly connected to the microprocessor/processor 32 to allow for wall mounting.

The two-stage pressure regulator 24 has a low-pressure side 22 where the pressure from the high-pressure side 26 is decreased through the regulator 28. Sight gauges 30 provide a visual reference as to the available pressure (high pressure side) and the delivered pressure (low pressure side/growler bottle). The pressurization is generally provided by connection to a high-pressure CO2, Argon, Nitrogen or beverage gas cylinder 32. The pressure regulator 28 has wireless communication capability to provide pressure signals (both high side and low side) to the microprocessor 38. Pressure adjustment is accomplished by manipulating the dial on the pressure regulator 28. The pressure is preferably provided by a conventional threaded 16-gram or 74-gram CO2 cartridges gas cartridge for spatial considerations. Commercially available gas cylinders such as SodaStream© 60L CO2 or 130L CO2 cylinders may be used to provide CO2 for pressurization. Use of the larger SodaStream© CO2 gas cylinders provide for an easily obtained source of CO2 from local brick and mortar stores such as Bed, Bath and Beyond, Target and Walmart. The larger SodaStream© cylinders provide a greater quantity of CO2 thus able to dispense and keep fresh and carbonated more beverage-filled growlers. This significantly contributes to the smart unit's ease of use.

The power supply 42 is a dual source (AC/DC) unit that provides power from an A/C electrical outlet that is rectified to operational D/C power or from its enclosed DC battery. The battery is also maintained on a trickle charge when the power supply 12 is connected to household power via the cord 44. In this fashion, the smart unit 2 may be disconnected from AC power and operated on a fully charged DC battery at any time. This allows the smart unit 2 to be taken along to a remote location or moved to a different room on a moment's notice, and without interrupted operation. Lower versions of the smart unit 2 will only have a direct or indirect A/C connection with its associated DC voltage regulator/convertor.

If the wireless device has cell phone communication protocol such as G3, G4 or the equivalent, the remote date connecting will also be maintained. The power supply is operably connected to any visual display panel, electrical sensors, microprocessors/processors, electro-mechanical devices, switches, lights and wireless communication devices associated with the smart unit 2.

The microprocessor/processor 38 is the hardware and software unit that interprets and provides the sensor data as well as any data from the cloud-based data storage or web portal to the user. This data may be provided to the user's own smart device or a provided visual display unit. Preferably, the data will be "pushed" to the user's smart device where it will be displayed on a downloaded interactive application. The microprocessor/processor 38 has a real-time clock and is in operative communication with the battery, wireless communication unit, all switches, lights, audible alarms, thermo-electric coolers, sensors and regulators associated with the smart unit 2. The microprocessor/processor 38 also controls any visual and audible alarms that may be incorporated in embodiments of the smart unit 2. These may include pressure, temperature and level audible alarms (piezo-electric horns) and visual indicators (sequenced leds).

Different embodiments will have different levels of electronic sophistication.

Figure 4:
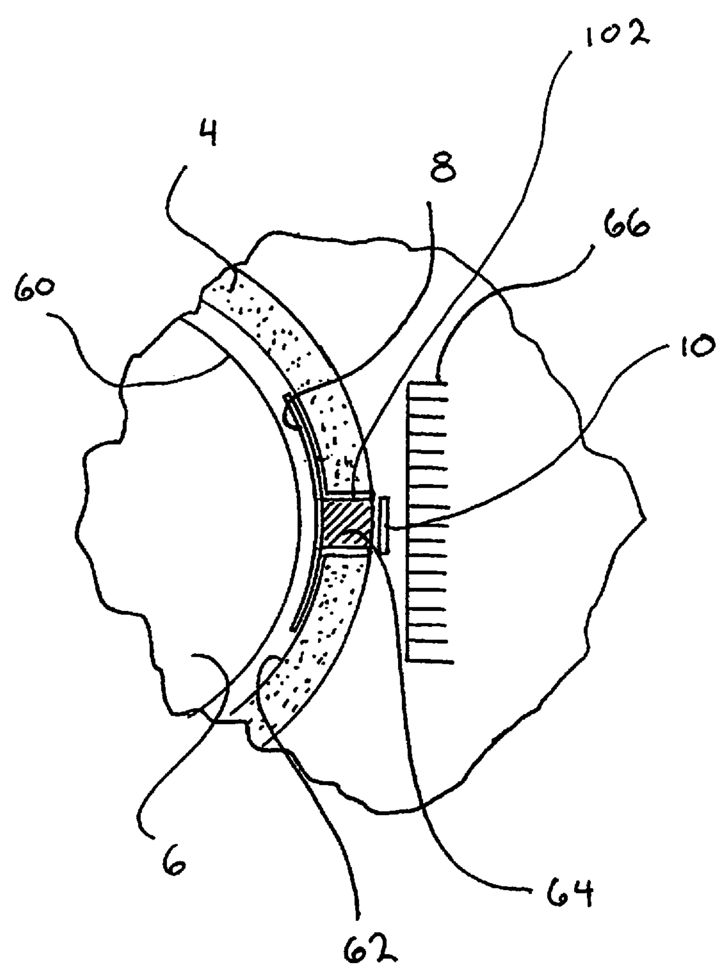
FIG. 4 is a partial cutaway cross sectional view of smart vessel wall in the region the Peltier thermos-electric cooling device is installed.

The Peltier device 10 can best be seen in FIG. 4. It functions to accomplish a thermal transfer of heat from the growler bottle 6 to the ambient air outside the vessel 4. There is a thin aluminum heatsink plate 8 convexly contoured to match the convex shape of the outer surface of the growler bottle 6 that is affixed on the inner face 62 of the interior side wall of the vessel 4. (In the preferred embodiment this will be that of a 5.75 inch diameter cylinder.) When the growler bottle 6 is placed in the vessel 4, the surface of the heatsink plate 8 contacts the growler's outer side wall 60. (In the illustration, for purposes of visual clarity, there is a small gap shown between the growler side wall 60 and the heatsink plate 8.)

To conduct heat from the growler bottle 6 and inside the vessel 4, the heatsink plate 8 is mechanically attached to the mechanical connector 64 by screws, and thermally connected to the Peltier device 10 with thermal grease. The mechanical connector 64 conducts heat from the heatsink plate 8 through a passage 102 that passes through the inner and outer walls of the vacuum insulated vessel. The passage 102 is sealed such that vacuum integrity is maintained within the two walls of the vessel. The Peltier device is then thermally connected to the finned aluminum heatsink 66 with thermal grease to conduct heat from the Peltier device 10.

The heat transferred across the Peltier device 10 is dissipated to the ambient outside air via forced air convection with the finned aluminum heat sink 66 located on the exterior of the vessel 4. Since the Peltier unit may be reversed, it can be used to keep the contents of the growler bottle 6 warm. By contacting the side wall of the growler bottle 6 and using a moderate sized heatsink plate 8 efficient heat transfer could be effected. In an alternate embodiment, the heatsink plate could be mounted on the bottom of the vessel 4. While this would ensure firm contact between the growler bottle 6 and the heatsink plate 8, it may not be as efficient transfer of heat as the cooler beverage will be at the bottom of the growler bottle 6.

Although designed to be in contact with the side wall of the growler bottle, (as in the case of an undersides diameter growler without the use of a removeable compressible sleeve) the heatsink plate 8 may not touch some of the containers used. In this case the atmosphere inside the smart unit 2 will be cooled thus indirectly cooling the beverage through the growler container side wall.

Figure 3:
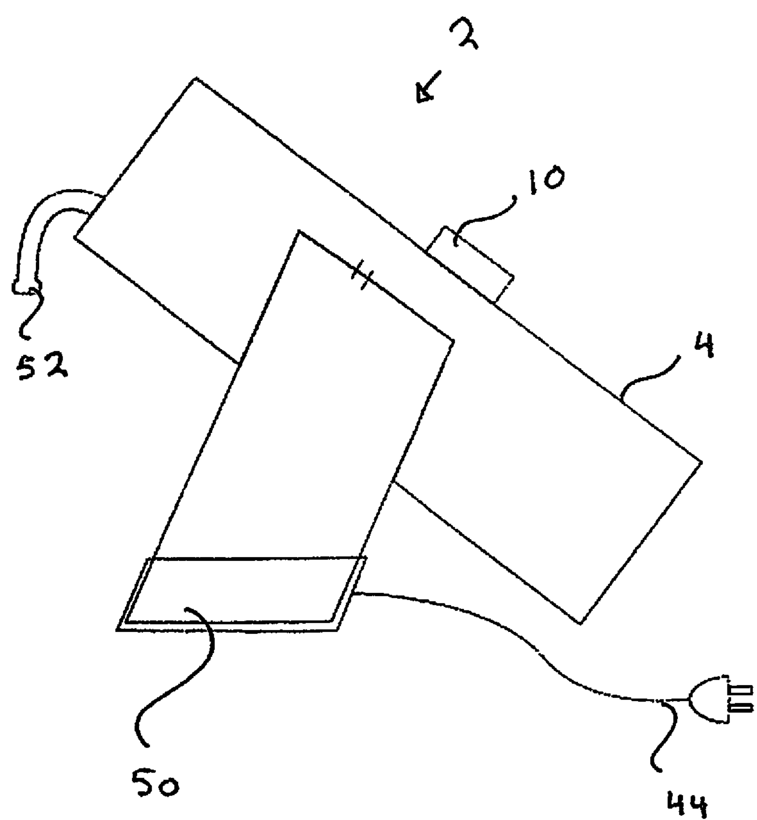
FIG. 3 is a side representative view of an embodiment of a smart vessel containment and dispensing unit in a tilt-able counter stand.

Referencing FIG. 3, the smart unit 2 can be seen coupled to a counter stand 50. This stand offers aesthetics to the combination as well as simplifying access to the beverage by its angled configuration. It has a top mounted tap spout 52 which is an extension off the tap 36 which may be integrated into the top of the vessel 4. This tap with the angled configuration of the smart unit 2 allows for the user to merely place his glass under the tap spout 52 and operate the tap. There is a first half electrical connector built into the counter stand that engage a matingly conformed second half electrical connector on the vessel's side wall. The electrical cord 44 emanates from the stand 52 and provides the operable power to the power supply 42 through coupled electrical connectors. In alternate embodiments, the angle configuration may be adjustable.

The smart unit 2 works in conjunction with an application to enhance the user's beverage options and to connect them to local beverage distributors, taverns, and associated vendors, for the presentation of data about beverages, events, specials, etc. The smart unit will also collect and provide the owner's demographics and related beverage information to marketing groups as well as local beverage distributors, taverns, and associated vendors. Typical collected data on the user's end will encompass beverage temperature, CO2 pressure, weight of the beverage-filled container, and date and time of any change in temperature, CO2 pressure, or weight of container. This data may provide for calculations to indicate the amount of CO2 remaining, and the volume of the beverage in the container. Data collected may also show the beverage dispense frequency, or the frequency that a user dispenses beverage from the container.

Customers may communicate via voice interactions to determine how much craft beverage is remaining in the container, freshness, type of beverage, brand, request recommendations for obtaining more craft beverages based on preferences (listed and/or historical purchases), request home delivery of a craft beverage, or the like. The smart unit 2 may optionally have an LCD or LED panel 110 to provide information on the craft beverage in the container housed within the product. The LCD or LED panel 110 may have an interactive touchscreen associated with it to provide for customer interaction with the product. And/or it may have a gesture/motion interface for customer interaction with the product.

As a smart Wi-Fi connected technology platform, the smart unit 2 and the associated smart device application will collect customer data regarding the customer's demographics, geo-location, local, regional and other travel habits, beverage preferences, on-site/at-home consumption history, restaurant/bar/brewpub visiting behaviors (frequency, time, date, consumption habits), and travel/commute information based on location/smart device application usage (including obtaining travel/commute data from other apps such as Google Maps).

Craft beverage data analytics and customer recommendations for craft beverages may be developed from collected customer data. Specific queries on the collected data in the relational databases may be ordered by specific third parties. Based on the results of those queries, contact toward a target rich audience for that third party's wares may be established by the administrator of the system. In the way of an example, customer data analytics may include predictive behavior for individual customers or customers with a certain geographical location, region, or a larger geographical area. Data analytics may also provide consumption habits based on time of day, day of the week or month, geo-location, local geographical area, regional area, significant events, customer demographics, type of craft beverages consumed, frequency of consumption.

Local, regional and other craft beverage or other beverage manufacturers may use the collected customer data for targeted marketing of products, services, special events or other. Collected customer data may also be used to target and facilitate home delivery of craft beverages from local brewpubs/breweries/tap houses/fill stations, and other products or services. However, all contact between the third parties and the end consumer will route through the administrator's main system on a paying basis.

The smart device Application will also allow customers to interact with local, regional, and other local brewpubs/breweries/tap houses/fill stations to learn about craft beverage offerings, products, special events and other based on their demographics, beverage preferences and consumption history; to connect customers to the craft beverage community, connect local brewpubs/breweries/tap houses/fill stations to the customer for targeted marketing, and facilitate home delivery of craft beverages from local brewpubs/ breweries/tap houses/fill stations. This will also be through the administrator's main system so there is no contact between the consumer and the third parties, allowing the administrator to reap the financial benefits of establishing the system.

The smart device Application will also allow customers to form 'clubs' where they can share their preferences with each other and to view the consumption habits of other club members. The clubs can be local, regional, or larger geographical areas, and can be formed based on many different factors (geo-location, craft beverage preferences, home brewers, or other).

The smart unit 2 feeds into a system for the ongoing generation of revenue for the smart unit manufacturers beyond that of the sales price of the original smart unit. The application provides some analytics on the data provided for immediate display of basic information to the consumer via the smart device or the tactile visual display on the smart unit itself, however it relays its data to the main computing device of the administrator. Here there is a massive relational database established with data from all consumers with a smart unit. This data can then be analyzed through specific written algorithmic programs to data mine these relational databases for the information that the third parties require. This data can be provided to the third parties for a price. With this data, the third parties can decide which group of smart unit owners they wish to market or present their information to. The third parties then pay the administrator again to relay their information to the smart unit owners belonging to the group identified in the query.

In operation, the smart unit's sensors provide temperature, pressure and weight (volume) signals to the microprocessor/processor 32 that links these events with data from the real-time clock and stores the data in a relational database. A change in the values of these signals may trigger the microprocessor to send a packet of current data to the application for storage in a database. In alternate embodiments, an event or lapsing of a pre-set timed interval may trigger this instantaneous collection and storage of sensor data. Also, the use of the tap may institute a data push.

The sensor signals provided to the microprocessor are also analyzed and output video and audio signals are sent to individual LED arrays located on the smart unit to indicate beverage volume, pressure and temperature. For low beverage volume and pressure, or for high or low beverage temperature, an audible alarm may be initiated.

As a smart Wi-Fi connected technology platform, the smart unit 2 and the associated smart unit application will also collect customer data regarding the customer's demographics, geo-location, local, regional and other travel habits, beverage preferences, on-site/at-home consumption history, restaurant/bar/brewpub visiting behaviors (frequency, time, date, consumption habits), and travel/commute information based on location/smart device application usage. This may be accomplished using an onboard GPS device that provides this travel/commute data to linked applications such as Google Maps and extracts a location for retrievable storage in one of the application's relational databases.

Demographic data about the consumer is input via their smart device upon the initial system startup. Alternatively, this demographic information may be obtained by automatic scouring of other social networks such as Facebook, Linked In, Twitter, etc. by the application, if permissions are granted by the consumer.

Upon growler fill ups, possibly even accomplished by home delivery services, the consumer would input what type of beverage was being put into the growler. In alternate embodiments, the GPS would provide a signal to the application which would utilize location services on the internet to determine exactly where the consumer was. If it was a brewery or tap-house the application would pull up the beverage menu for that location and allow the user to quickly click on the craft beer purchased for input to the application.

The application queries the relational database and performs different types of analytics on the data based on what information is sought. (e.g.—every change in growler weight is sensed by the weight sensing (strain) gauge which relays the signal to the microprocessor since there is continual feedback and communication between the sensors and the microprocessor. This information is processed and date stamped by the microprocessor and sent to the application where it is stored in one of the relational databases. Algorithms from the application can query the databases and determine the size of the beverage pour, the date, day and time of consumption, time between consumptions, number of consumptions per unit time.) The information from these queries trigger the generation of operable instructions or notices from the application delivered to other devices, including back to the smart unit and user's smart device. Some of this information is sent back to a master database in the administrator's WiFi linked computer system where it is stored with the rest of the smart unit owner's data. The administrator runs further analytics on this data as requested by his paying customers—the craft beverage vendors, etc. These queries are specific inquires requested by the third parties looking for information that will allow them to better target potential consumers for their specific purposes. The customers can then generate ads, informational data packets and the like that are sent via the administrator, to the smart unit customers having the demographics that the customers wish to target. The administrator also broadcasts informational and data packets of its own to the smart unit owners.

In the way of an example, craft beverage data analytics and customer recommendations for craft beverages may be developed from configurable queries that the administrator performs on the smart unit's stored data such as: predictive behavior for individual customers; customers with a certain geographical location, region, or a larger geographical area; consumption habits based on time of day, day of the week or month, geo-location, local geographical area, regional area, significant events; customer demographics; type of craft beverages consumed; and frequency of consumption.

Local, regional and other craft beverage or other beverage manufacturers may use the collected customer data for targeted marketing of products, services, special events or other. Collected customer data may also be used to target and facilitate home delivery of craft beverages from local brewpubs/breweries/tap houses/fill stations, and other products or services. These will be provided to the administrator who is the gatekeeper or rather the toll taker of this two way system.

There will also be the ability for a smart unit owner to interact with local, regional, and other local brewpubs/breweries/tap houses/fill stations to learn about craft beverage offerings, products, special events and other based on their demographics, beverage preferences and consumption history; to connect customers to the craft beverage community, connect local brewpubs/breweries/tap houses/fill stations to the customer for targeted marketing, and facilitate home delivery of craft beverages from local brewpubs/breweries/tap houses/fill stations. The smart unit application will also allow customers to form 'clubs' where they can share their preferences with each other and to view the consumption habits of other club members. The clubs can be local, regional, or larger geo-graphical areas, and can be formed based on many different factors (geo-location, craft beverage preferences, home brewers, or other). This can be accomplished through the smart unit owner's smart device.

Data collected from the smart unit 2 may include: product operation, when it is turned on and turned off (time, date, geo-location); beverage level (with time, date, geo-location); beverage temperature; temperature inside the vessel; CO2 system pressure; CO2 pressure within the growler; type of growler; volume of beverage; time and date of any physical change; magnitude of change; geo-location of smart unit, including date and time. change in geo-location of product, including date and time.

Data may be collected on set frequency intervals or upon sensor signal changes or upon activation of the tap Data collected by consumer input via the smart unit application may include: CO2 cartridge type and size; type of container placed in the vessel; beverage purchase information (including geo-location of purchase) The information collected by input from the smart device application can be extensive and include the following data:

a) Information on the beverage purchased. This may be from online data available at the point of purchase i.e. Via the credit/debit card transaction, or through another beer app such as Taplister, Untapped, Digital Pour, or others.
   i) Company brand and information (such as McMenamins . . . )
   ii) Product brand (such as Terminator Stout or Black Widow Stout)
   iii) Description of beverage in the container
   iv) Type of Beverage
   v) Data including ABV (Alcohol by Volume) and IBV (International Bitterness Units) if applicable.
   vi) Purchase date and time.

2) Customer demographics captured that may include:
   a) Age
   b) Gender
   c) Education
   d) Income
   e) Occupation
   f) Lifestyle preferences
   g) Beverage preferences
      i) Type of beverage such as beer, hard cider, kombucha, coffee, tea, other (root beer, or . . . ), whiskey, vodka, gin, hard drinks, etc.
         (1) Specific type of beer such stout, porter, pilsner, etc.
         (2) Specific type hard cider (if there are delineations . . . )
         (3) Specific type of kombucha . . .
         (4) Other 3) Geo-location of customer/smart device (assumes App installed).

4) Geo-mapping of the customer's travel habits and proximity to brewpubs/breweries/tap houses/fill stations for local travel habits and other travel destinations (assumes App installed). App may access other apps such of Google Maps for data.

Collected Data Provides Targeted Marketing Opportunities to Customer

1) From local brewpubs/breweries/tap houses/fill stations/ etc.
2) From local or regional distributors.
3) For craft beverage home delivery.
4) Other services and products associated with the craft beverage industry, either locally, regionally, or out of the area.
5) Other . . .

Smart Device and Web Portal Apps Provide for

6) Information on beverage within product
7) Temperature adjustment
8) Connecting to local brewpubs/breweries/tap houses/fill stations/etc.
9) Power source. If product is powered by portable battery power, provides power remaining/usage time remaining.

The beverage contents may also be able to be input to the application by identifying and associating the beverage purchased with the container in which it is dispensed into. This could be by a color-coded cap, an RFID tag, barcode, QR Code, by a digital photo using a smart device, or a digital photo of the growler of craft beverage when purchased at a brewpub/brewery/tap house/fill station could then be associated with the craft beverage purchased from in-store information retrieved electronically.

There is a plethora of data that can be derived from the data collected about the beverage condition, the beverage, the smart unit and the consumer's preferences and habits.

Figure 5:
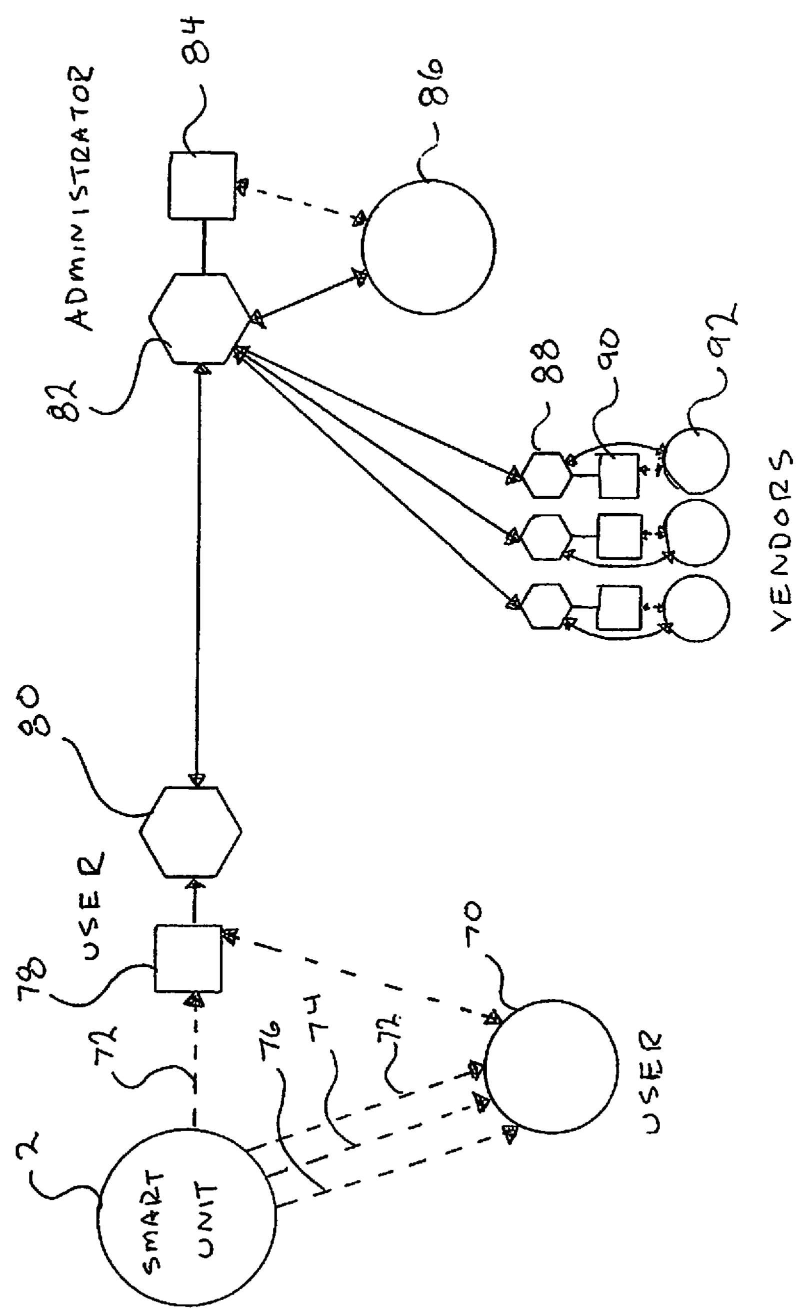
FIG. 5 is a schematic drawing of the data transfer system of the smart unit showing the path and method of secondary revenue.

Looking at FIG. 5 the data communication schematic can best be seen illustrating the direction of data pushes of information. The smart unit 2 pushes data from its microprocessor to the user's smart device 70 via WiFi 72, B/T 74 or cell 4G data transfer protocols. There it is interpreted and displayed through the smart application on the user's smart device. The smart unit 2 also communicates wirelessly via WiFi to the User's WAP 78 connected to the User's router 80. The User's smart device 70 is connected via WiFi to the User's WAP 78 and User's router 80 for two-way data communication. The User's router 80 is connected for two-way transfer of data to the Administrator's router 82 and possibly to the Administrator's WAP 84 which passes data to and from the Administrator's computer system 86. The User's router 80 is also connected for two-way transfer of data to the Vendor's router 88 and possibly to the Vendors's WAP 90 which passes data to the Vendor's computer 92. The Vendors and the Users are never in direct communication. All data from the Vendors is filtered and sent to the appropriate User's based on data profiles of the Users derived for a fee from analytics requested by the Vendors and performed by the Administrator. The Administrator collects fees from the Vendors for performing analytics on the data recovered from the smart unit 2 and data sent by the smart device 70. The Administrator then collects fees from the Vendors again for dispersing the Vendor's data to selected users. The Administrator is the "gatekeeper" or "tollsman" for this system.

In general, embodiments can employ as a microprocessor/ processor, any device or combination of devices, that can operate to execute instructions to perform functions as described herein. Merely by way of example, and without limitation, any microprocessor can be used as a processor, including without limitation one or more complex instruction set computing (CISC) microprocessors, such as the single core and multicore processors available from Intel Corporation™ and others, such as Intel's X86 platform, including, e.g., the Pentium™, Core™, and Xeon™ lines of processors. Additionally, and/or alternatively, reduced instruction set computing (RISC) microprocessors, such as the IBM Power™ line of processors, processors employing chip designs by ARM Holdings™, and others can be used in many embodiments. In further embodiments, a processor might be a microcontroller, embedded processor, embedded system, system on a chip (SoC) or the like. Thus, the embodiments set forth herein should not be considered limiting.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A smart vessel for the containment and dispensing of a beverage, consisting of:

a portable vacuum insulated container having a top, a bottom, an exterior side wall and an interior side wall in an airtight sealed configuration that defines an annulus therebetween, said annulus having an internal pressure less than 14.7 psia;

an interior cavity defined within said inner side wall configured to house one standard 64 ounce growler bottle having a diameter of 5¾ inches so as to be in direct contact with a concave heat sink plate affixed to said interior side wall;

a thermoelectric cooler affixed to said exterior side wall and thermally connected to said concave heat sink plate for thermal transfer;

a heat sink connected to said thermoelectric cooler for thermal transfer;

a microprocessor unit mounted on said exterior side wall for the receipt and processing of at least one of a data signal;

a LCD display panel on said exterior side wall and operatively connected to said microprocessor;

a dual source (AC/DC) power supply with a contained battery, said power supply operatively connected to said smart vessel;

at least one sensor operatively connected to said microprocessor for the transfer of said data signal selected from the group of signals consisting of at least one of temperature, pressure and weight data;

a removeable growler bottle residing within said interior cavity;

a removeable growler bottle cap having a dispensing orifice and a pressurizing orifice formed therethrough;

a pressure regulator adapted for operable connection to a high-pressure gas cylinder to provide an adjustable pressure of a gas to said growler through a pressurizing tube extending through said top and into said pressurizing orifice;

a dispensing tap connected to said growler by a beverage supply tube extending through said top, through said dispensing orifice and to a bottom of said growler;

a wireless communication device mounted on said exterior side wall and operably connected to said microprocessor and said power supply;

a smart device application in said microprocessor, said smart device application in communication with said at least one sensor through said microprocessor; and a relational database in said smart device application storing data from said at least one sensor; and wherein said smart device application transfers said data from said operational database to a WI-FI connected computer system through said wireless communication device.

2. A smart vessel for the containment and dispensing of a beverage, consisting of:

a portable vacuum insulated container having a top, a bottom, an exterior side wall and an interior side wall in an airtight sealed configuration that defines an annulus therebetween, said annulus having an internal pressure less than 14.7 psia;

an interior cavity defined within said inner side wall configured to house one standard 64 ounce growler bottle having a diameter of 5¾ inches so as to be in direct contact with a concave heat sink plate affixed to said interior side wall;

a thermoelectric cooler affixed to said exterior side wall and thermally connected to said concave heat sink plate for thermal transfer;

a heat sink connected to said thermoelectric cooler for thermal transfer;

a microprocessor unit mounted on said exterior side wall for the receipt and processing of at least one of a data signal;

a LCD display panel on said exterior side wall and operatively connected to said microprocessor;

a dual source (AC/DC) power supply with a contained battery, said power supply operatively connected to said smart vessel;

at least one sensor operatively connected to said microprocessor for the transfer of said data signal selected from the group of signals consisting of at least one of temperature, pressure and weight data;

a removeable growler bottle residing within said interior cavity;

a removeable growler bottle cap having a dispensing orifice and a pressurizing orifice formed therethrough;

a pressure regulator adapted for operable connection to a high-pressure gas cylinder to provide an adjustable pressure of a gas to said growler through a pressurizing tube extending through said top and into said pressurizing orifice;

a dispensing tap connected to said growler by a beverage supply tube extending through said top, through said dispensing orifice and to a bottom of said growler;

a sealed passage extending between said interior side wall and said exterior side wall;

a mechanical connector connecting said heatsink plate to said thermoelectric cooler, said mechanical connector residing within said sealed passage;

a wireless communication device mounted on said exterior side wall and operably connected to said microprocessor and said power supply;

a smart device application in said microprocessor, said smart device application in communication with said at least one sensor through said microprocessor; and a relational database in said smart device application storing data from said at least one sensor; and wherein said smart device application transfers said data from said operational database to a WI-FI connected computer system through said wireless communication device.

3. The smart vessel of claim 2 wherein said at least one sensor includes a pressure sensor on said bottom that provides a growler weight data signal.

4. The smart vessel of claim 2 wherein said at least one sensor includes a temperature sensor located on said interior side wall to provide a growler content temperature data signal.

5. The smart vessel of claim 2 wherein said at least one sensor includes a pressure sensor located in said pressure regulator to provide a growler pressure data signal.

6. A smart vessel for the containment and dispensing of a beverage, consisting of:

a portable vacuum insulated container having a top, a bottom, an exterior side wall and an interior side wall in an airtight sealed configuration that defines an annulus therebetween, said annulus having an internal pressure less than 14.7 psia;

an interior cavity defined within said inner side wall configured to house one standard 64 ounce growler bottle having a diameter of 5¾ inches so as to be in direct contact with a concave heat sink plate affixed to said interior side wall;

a thermoelectric cooler affixed to said exterior side wall and thermally connected to said concave heat sink plate for thermal transfer;

a heat sink connected to said thermoelectric cooler for thermal transfer;

a microprocessor unit mounted on said exterior side wall for the receipt and processing of at least one of a data signal;

a LCD display panel on said exterior side wall and operatively connected to said microprocessor;

a dual source (AC/DC) power supply with a contained battery, said power supply operatively connected to said smart vessel;

at least one sensor operatively connected to said microprocessor for the transfer of said data signal selected from the group of signals consisting of at least one of temperature, pressure and weight data;

a removeable growler bottle residing within said interior cavity;

a removeable growler bottle cap having a dispensing orifice and a pressurizing orifice formed therethrough;

a pressure regulator adapted for operable connection to a high-pressure gas cylinder to provide an adjustable pressure of a gas to said growler through a pressurizing tube extending through said top and into said pressurizing orifice;

a dispensing tap connected to said growler by a beverage supply tube extending through said top, through said dispensing orifice and to a bottom of said growler;

a sealed passage extending between said interior side wall and said exterior side wall;

a mechanical connector connecting said heatsink plate to said thermoelectric cooler, said mechanical connector residing within said sealed passage;

a wireless communication device mounted on said exterior side wall and operably connected to said microprocessor and said power supply;

a smart device application in said microprocessor, said smart device application in communication with said at least one sensor through said microprocessor; and a relational database in said smart device application storing data from said at least one sensor;

wherein said smart device application transfers said data from said operational database to a WI-FI connected computer system through said wireless communication device; and wherein said at least one sensor includes a pressure sensor on said bottom that provides a growler weight data signal; and wherein said at least one sensor includes a temperature sensor located on said interior side wall to provide a growler content temperature data signal; and wherein said growler bottle cap has an elastomer seal about where it contacts and connects to said smart vessel 4.

* * * * *